Aug. 8, 1950           C. W. MORRIS           2,518,246
EXPANSION MEANS FOR COOLING AN AIRCRAFT CABIN
Filed July 20, 1945           2 Sheets-Sheet 1
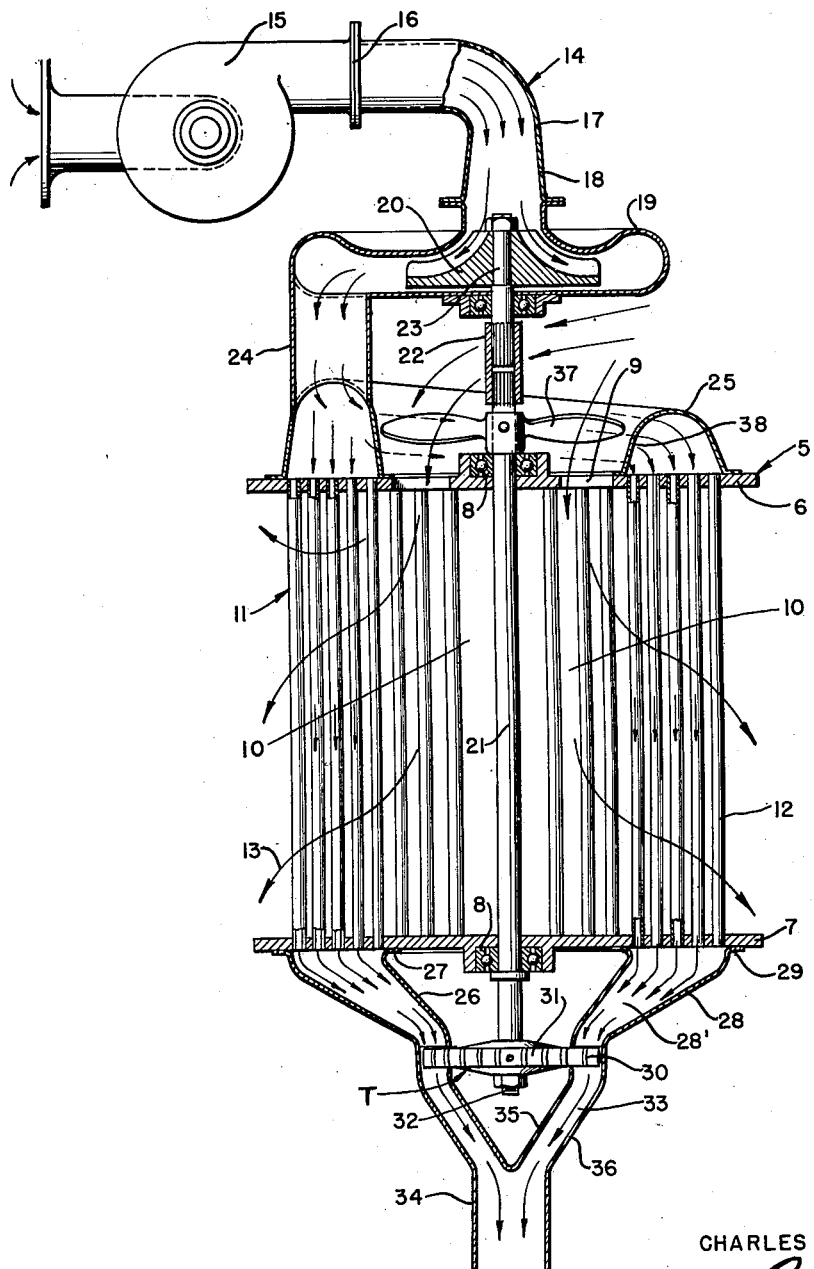
Fig. 1
INVENTOR.
CHARLES W. MORRIS
BY
ATTORNEY Aug. 8, 1950     C. W. MORRIS     2,518,246
EXPANSION MEANS FOR COOLING AN AIRCRAFT CABIN
Filed July 20, 1945     2 Sheets-Sheet 2

INVENTOR.
CHARLES W. MORRIS
BY

ATTORNEY

Patented Aug. 8, 1950

2,518,246

UNITED STATES PATENT OFFICE 2,518,246

EXPANSION MEANS FOR COOLING AN AIRCRAFT CABIN

Charles W. Morris, Los Angeles, Calif., assignor to The Garrett Corporation, Airesearch Manufacturing Company division, Los Angeles, Calif., a corporation of California Application July 20, 1945, Serial No. 606,179

11 Claims. (Cl. 62—136)

My invention relates in general to air conditioning equipment and relates in particular to a simple device for reducing the temperature of air which need not involve the use of a condensable refrigerant.

It is an object of the invention to provide an air cooler which uses atmospheric air as the coolant or heat abstracting medium, whereby a flow of air, also drawn from the atmosphere, is cooled.

A further object of the invention is to provide a device in which the air to be cooled is compressed so as to raise its temperature above that of the surrounding air, or atmospheric air from which the air to be cooled is drawn, the compressed air being then passed through a cooler which employs atmospheric air as a coolant and then reexpanded to the pressure of the chamber in which it is to be used, or which is to be air-conditioned, this reexpansion of the cooled, compressed air accomplishing a reduction in its temperature to a value below the temperature of the outer atmosphere and also recovering a usable portion of the power expended in the compression of the air.

It is an object of the invention to provide a simple device which by itself is an important and independently usable air-conditioning unit, but which may be used with other air-conditioning equipment where a close control of temperature and humidity is required. An important usefulness of the invention, due to its small size and weight, is in connection with systems for pressurizing aircraft cabins, in which system the compression of air results in a rise in its temperature so that unless the compressed air is cooled before it is delivered into the cabin, the cabin interior will be heated to a temperature higher than is comfortable for the occupants. The device shown herein may be connected in series into a duct through which air under pressure is delivered to a cabin or other space for the purpose of pressurization.

It is one of the objects of my invention to provide a method and apparatus whereby there is established a path of flow for replenishment air for the cabin and in which path there is located power absorbing parts which are driven by the flow of air in said path, the absorbing of power by said parts extracting heat from the replenishment air.

It is also an object of my invention to provide a method and apparatus of the character as pointed out in the preceding paragraph, in which there is a cooler means located in the path for the replenishment air located on the intake side of said means having the power absorbing parts.

It is a still further object of my invention to provide a method and apparatus of the character pointed out in the preceding paragraph in which there is a compressor means in the path of flow of the replenishment air, which compressor means is located on the intake side of said cooler means and is driven by said power absorbing parts.

A further object of the invention is to provide an air cooler having a relatively light supporting structure which defines a central air space, there being air cooling means arranged on opposite sides of or around this air space, and simple means for directing air to be cooled through the cooling means and also for forcing atmospheric air into the central space so that it will move in a generally radial direction through the coolant passages of the cooling means.

A further object of the invention is to provide a device of the character set forth in the preceding paragraph wherein the supporting structure is provided with bearings for rotatably supporting a shaft which extends lengthwise through the central air space and has its rear end connected to the moving part of an air-operated engine through which the cooled compressed air is reexpanded, the power derived from such reexpansion of the air being carried by the shaft to a power utilizing means disposed at the front end of the supporting structure.

A further object of the invention is to provide a device of this character wherein the shaft transmits power derived from the reexpansion of the air to a blower or fan by which atmospheric air is circulated through the central air space and thence through the coolant passages of the cooling means.

A further object is to provide in a device of this character a means whereby the recovered power which is transmitted to the shaft is utilized, at least in part, in the compression of the air to be cooled.

A further object of the invention is to provide a simple air turbine arrangement whereby the cooled and compressed air is reexpanded so as to be further cooled and power is recovered as a result of such reexpansion.

Further objects and advantages of the invention will be brought out in the following part of the specification.

Referring to the drawings which are for illustrative purposes only:

Figure 1 is a sectional view constituting a simplified, somewhat schematic, showing of a preferred embodiment of my invention;

Figure 2:
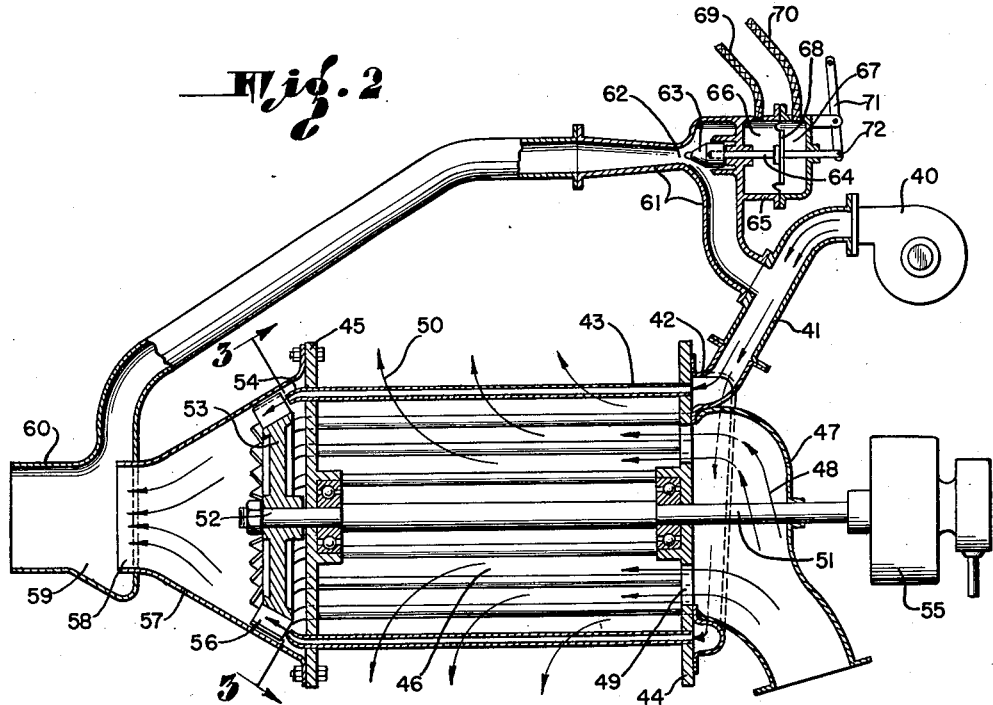
Figure 2 is a sectional view showing an alternative form of the invention.

In the form of the invention shown in Figure 1, a light-weight supporting structure 5 is employed which has front and rear end plates 6 and 7 of circular form. The front plate 6 has substantially in the center thereof a bearing 8 and surrounding the bearing there are air inlet openings 9. The rear plate 7 has a centralized bearing 8, but openings are omitted therefrom.

In this supporting structure 5 there is defined a central air space 10 around which air cooling means 11 are disposed, such air cooling means consisting of tubes 12 which extend from the plate 6 to the plate 7 and have the ends thereof seated in openings in the plates 6 and 7 in the general manner employed in heat exchanger constructions. The tubes 12 are arranged around the axis of the supporting structure so as to form a cylindric cage around the central air space 10, the spaces between the tubes 12 constituting cross flow passages of the cooling means 11 through which the coolant air may flow from the space 10 as indicated by arrows 13.

The air to be cooled is compressed by an air compressor means 14 having two stages. The first stage of this air compressor means consists of a centrifugal blower 15, the outlet 16 of which is connected by means of an elbow 17 to the inlet 18 of a centrifugal compressor 19 having an impeller 20 preferably axially aligned with the bearings 8 of the supporting structure 5 so that a shaft 21, rotatably supported by the bearings 8, may be connected by a suitable flexible connection 22 with the impeller shaft 23.

A duct 24 connects the outlet of the compressor means 14 to a ring-shaped manifold 25 which is secured to the front face of the supporting plate 6 to direct the compressed air into the front ends of the tubes 12 of the cooling means 11. To the rear face of the end plate 7 there is secured a conoidal shell member 26, the margin 27 of which engages the end plate 7 radially inwardly of the outlet openings of the tubes 12. A larger conoidal shell 28 is placed around the shell member 26, and has its marginal portion 29 connected to the rear face of the end plate 7 outside the openings of the tubes 12. The shell members 26 and 28 are formed in their converging relation as shown in Figure 1 so as to provide an annular air passage 28' which is reduced in diameter and in area as it approaches the peripherally disposed vanes 30 of turbine rotor 31 fixed on the rerwardly extending end 32 of the shaft 21. From the rotor vanes 30 the air passes through a conoidal passage 33 to an air outlet duct 34, which, if the apparatus is used on aircraft, may be connected to the aircraft cabin. The passage 33 is formed between a conical wall 35 and a conoidal wall 36, which walls 35 and 36 are substantially continuations of the walls of the shells 26 and 28.

A fan 37 is fixed on the shaft 21 in such a position that it will cause movement of atmospheric air through the air inlet openings 9 into the central space 10 and then outwardly through the passages between the tubes 12. To accomplish this result, I have placed the fan 37 on the shaft 21 just ahead of the openings 9 in the end wall 6, the fan 37 thereby being positioned within the space defined by the interior wall portion 38 of the manifold 25.

In the operation of the device shown in Figure 1, the air to be cooled is compressed by the compressor means 14 and is delivered at raised temperature to the cooling means. In passing through the tubes 12 of the cooling means 11, the air is subjected to a first cooling action. A second cooling action is imposed upon the air flow by its passage through the reexpansion turbine shown at T as consisting of the rotor 31 and associated parts. The air inlet passage 28' of the turbine T converges toward the vanes 30 so that the velocity of the air is greatly increased prior to its engagement with the vanes 30 and a high speed rotation of the rotor 31 is thereby accomplished and a recovery of power from the air is attained, which power is transmitted to the shaft 21 to the fan 37 and the impeller 20 of the second stage compressor 19. At this time a reexpansion of the compressed air, with a resultant further cooling thereof, is accomplished so that the air delivered through the duct 34 to the point of utilization is at a desired lower temperature.

Figure 3:
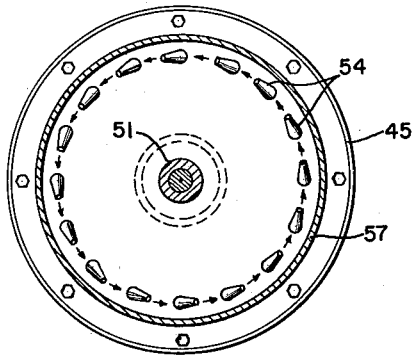
Figure 3 is a sectional view taken as indicated by the line 3—3 of Figure 2.
Figure 3:

In the form of the invention shown in Figures 2 and 3, I have shown in a somewhat schematic manner an alternative form of the invention wherein many of the constructional characteristics of Figure 1 are repeated. In this form of the invention the means for compressing the air to be cooled is shown as a compressor 40 which delivers the compressed air through a duct 41 to an annular manifold 42 communicating with the front ends of cooler tubes 43 which extend from a plate 44 to a plate 45, these tubes 43 being arranged so as to form a cage around a central air space 46. A cooling air inlet housing 47 is connected to the front face of the plate 44 in a position to direct air, as indicated by arrows 48, through the air inlet openings 49 of the plate 44 to the air space 46, from which the air flows outwardly through the spaces between the tubes 43 as indicated by arrows 50.

A shaft 51 is extended through the space 46 defined by the supporting structure consisting of the end plates 44 and 45 and the tubes 43. This shaft 51 has on its front end 52 a means 53 for recovering power from the air which issues from nozzles 54 at the rear ends of the tubes 43. The opposite end of the shaft 52 is connected to a means 55 for utilizing the power recovered from the compressed air after it has passed through the cooling tubes 43. The power recovering means 53 consists of a rotor having vanes 56 positioned so as to be impinged by the jets of air which issue from the nozzle 54. As shown in Figure 3, the nozzles 54 are inclined in the direction of rotation desired for the rotor 53, and these nozzles are formed in a simple manner by tapering the rear ends of the tubes 43 which project through the plate 45 and then bending these tapered ends to the desired angle, thereby providing the diagonally directed nozzles 54. The power utilizing means 55, which places a load on the shaft 51 to resist free rotation of the rotor 53, may consist of any power-driven mechanism, such, for example, as an oil circulating pump.

A conoidal housing 57 is connected to the rear face of the end plate 45 in a position to cover the rotor 53. The reduced outlet 58 of the housing 57 projects into a housing 59 from which there extends an air outlet connection 60 adapted to be connected to a duct or other space which is to receive the cooled air. From the compressed air inlet duct 41 an air bypass duct 61 has therein a valve throat 62 controlled by a conical valve member 63 which is mounted on a slidably disposed shaft 64. This shaft 64 extends into a housing 65 which is divided into adjacent pressure chambers 66 and 67 by a diaphragm 68. The central portion of the diaphragm 68 is connected to the shaft 64, and the movement of the diaphragm by differential pressure between the chambers 66 and 67 is transmitted to the shaft 64 to the valve 63. Controlling air pressure is transmitted from a control unit, not shown, through air ducts 69 and 70. A lever 71 is pivotally mounted upon the housing 65 and one of its ends is connected to the projecting end 72 of the shaft 64, thereby providing externally of the housing 65 a member which has movement in accordance with the movement of the valve 63, to which the follow-up mechanism of the control unit may be connected.

The coolant air which is directed through the housing 47 may be derived from any source of air pressure. In an aircraft it may be obtained from an air rammed duct. It will be understood that in the operation of this device the proportions of air directed through the cooler and through the bypass 61 are varied in accordance with the deviation of the temperature in the air-conditioned space supplied by the device from the selected temperature. The control of the bypass valve 63 may be manual, or may be accomplished by use of automatic temperature responsive control mechanism not forming a part of this invention. In both forms of the invention shown herein the work done by the air in driving the reexpansion turbines constitutes an absorption of energy which has been converted from pressure energy to kinetic energy. Therefore this conversion of energy results in a cooling of the air in addition to the cooling effect resulting from the mere increase in volume of the air after it reaches the tubes of the coolers.

Although I have shown but two forms in which my invention may be embodied, it should be understood that the method and apparatus of my invention may be modified and I therefore do not wish to be limited to the details of construction disclosed herein, but wish my invention to be construed in accordance with the statement of invention and appended claims. The term "cabin" or "aircraft cabin" as used herein is to be broadly construed to mean any space or compartment in aircraft to which the conditioned air is to be delivered.

I claim as my invention:

1. In an air cooler, the combination of: a plurality of tubes arranged in co-extending relation so as to surround a central space; a wall closing one end of said space; means for delivering coolant air into the other end of said space so that it will flow out through the spaces between said tubes; means for delivering air to be cooled into the front ends of said tubes; and turbine means at the rear ends of said tubes to receive the air which has been cooled in passing through said tubes, said cooled air driving said turbine.

2. In an air cooler, the combination of: a plurality of tubes arranged in co-extending relation so as to surround a central space; a wall closing one end of said space; means for delivering coolant air into the other end of said space so that it will flow out through the spaces between said tubes; means for delivering air to be cooled into the front ends of said tubes; turbine means at the rear ends of said tubes to receive the air which has been cooled in passing through said tubes, said cooled air driving said turbine; and power recovery means connected to said turbine means.

3. In an air cooler, the combination of: a plurality of tubes arranged in co-extending relation so as to surround a central space; a wall closing one end of said space; means for delivering coolant air into the other end of said space so that it will flow out through the spaces between said tubes; means for delivering air to be cooled into the front ends of said tubes; turbine means at the rear ends of said tubes to receive the air which has been cooled in passing through said tubes, said cooled air driving said turbine; and power transmission means connecting said turbine means to said means for delivering coolant air to said space to drive the same.

4. In an air cooler, the combination of: a plurality of tubes arranged in co-extending relation so as to surround a central space; a front plate and a rear plate in spaced relation and having openings therein to receive the ends of said tubes; means for delivering coolant air into said space so that it will flow out through the spaces between said tubes; means for delivering air to be cooled into the front ends of said tubes; and turbine means at the rear ends of said tubes to receive the air which has been cooled in passing through said tubes, said cooled air driving said turbine.

5. In an air cooler, the combination of: a plurality of tubes arranged in co-extending relation so as to surround a central space; a front plate and a rear plate in spaced relation and having openings therein to receive the ends of said tubes; means for delivering coolant air into said space so that it will flow out through the spaces between said tubes; means for delivering air to be cooled into the front ends of said tubes; inner and outer spaced conical walls connected to said rear plate so as to define an air nozzle extending from the rear ends of said tubes; a rotatably supported turbine rotor having vanes disposed at the outer end of said nozzle, to receive the cooled air from said nozzle whereby said rotor will be driven and said air from said nozzle further cooled; and air outlet means disposed so as to receive the air which has passed between said vanes to said turbine rotor.

6. Mechanism for conditioning air to be supplied to a cabin of an aircraft, the combination of: inlet and outlet end plates; a plurality of parallel tubes supported by said end plates around a central space, said tubes being spaced for the flow of coolant air therearound; an inlet manifold whereby air to be supplied to said cabin is delivered to the inlet ends of said tubes; an inlet conduit leading to said inlet manifold; a shaft extending through said end plates, through said central space, and parallel to said tubes; an expansion turbine having a rotor driven by the cabin air discharged from said tubes, said rotor driving said shaft; and a compressor in said inlet conduit driven by said shaft.

7. Mechanism for conditioning air to be supplied to a cabin of an aircraft, the combination of: inlet and outlet end plates; a plurality of parallel tubes supported by said end plates around a central space, said tubes being spaced for the flow of coolant air therearound; an annular inlet manifold supported by said inlet end plate whereby air to be supplied to said cabin is delivered to the inlet ends of said tubes; an inlet conduit leading to said inlet manifold; a shaft extending through said end plates, through said central space, and parallel to said tubes; an expansion turbine having a rotor driven by the cabin air discharged from said tubes, said rotor driving said shaft; and a compressor in said inlet conduit driven by said shaft.

8. Mechanism for conditioning air to be supplied to a cabin of an aircraft, the combination of: inlet and outlet end plates; a plurality of parallel tubes supported by said end plates around a central space, said tubes being spaced for the flow of coolant air therearound; an inlet manifold whereby air to be supplied to said cabin is delivered to the inlet ends of said tubes; an inlet conduit leading to said inlet manifold; a shaft extending through said end plates, through said central space, and parallel to said tubes; an expansion turbine having a rotor driven by the cabin air discharged from said tubes, said rotor driving said shaft; a compressor in said inlet conduit driven by said shaft; and fan means driven by said shaft for circulating said coolant air, there being a coolant air opening in the central part of said inlet end plate through which coolant air may flow between said tubes.

9. Air conditioning means for use in an air conditioning system having a source of air under compression: means forming a path of flow of said air from said source to the place of air utilization; a booster compressor in said path of flow receiving the air directly from said source of air under compression; a cooling turbine in said path of flow disposed so as to receive the air from said compressor; a heat exchanger in said path of flow between said booster compressor and said turbine to cool the air; a drive connection from said turbine to said compressor to drive said compressor independently of said source of air under compression; circulating means operative to move a coolant through said heat exchanger; and means to operate said circulating means from said drive connection.

10. In an air conditioning system having a source of air under compression: transmission means having a projecting power input shaft end and a power output shaft end; a rotary booster compressor having its rotary part connected to said output shaft end, said compressor having an axial inlet port, faced outwardly from said power output shaft end, to receive compressed air from said source; a cooling turbine having its rotary part connected to said input shaft end, said turbine having an outlet port faced outwardly from said power input shaft end; a heat exchanger between the outlet of said booster compressor and the inlet of said turbine for cooling the air as it is conveyed from said compressor to said turbine; circulating means for moving a coolant through said heat exchanger; and a drive connection from an intermediate portion of said transmission means to said circulating means.

11. In an air conditioning system having a source of air under compression: shaft having a power input end and a power output end; a rotary booster compressor having its rotary part connected to said output shaft end, said compressor having an axial inlet port, faced outwardly from said power output shaft end, to receive compressed air from said source; a cooling turbine having its rotary part connected to said input shaft end, said turbine having an outlet port faced outwardly from said power input shaft end; a heat exchanger between the outlet of said booster compressor and the inlet of said turbine for cooling the air as it is conveyed from said compressor to said turbine; circulating means for moving a coolant through said heat exchanger; and a drive connection from an intermediate portion of said shaft to said circulating means.

CHARLES W. MORRIS.

REFERENCES CITED

The following references are of record in the file of this patent:

UNITED STATES PATENTS

| Number | Name | Date |
|---|---|---|
| 1,989,636 | Edwards | Jan. 29, 1935 |
| 2,020,923 | Seggern | Nov. 12, 1935 |
| 2,046,314 | Benkly | July 7, 1936 |
| 2,391,838 | Kleinhans | Dec. 25, 1945 |
| 2,394,253 | Nettel | Feb. 5, 1946 |